US011797865B2

(12) United States Patent
Burchard

(10) Patent No.: US 11,797,865 B2
(45) Date of Patent: *Oct. 24, 2023

(54) SYSTEM AND METHOD FOR PERFORMING FAST COMPUTATIONS USING QUANTUM COUNTING AND PSEUDO-RANDOM SETS

(71) Applicant: Goldman Sachs & Co. LLC, New York, NY (US)

(72) Inventor: Paul Burchard, Jersey City, NJ (US)

(73) Assignee: GOLDMAN SACHS & CO. LLC, New York, NY (US)

( * ) Notice: Subject to any disclaimer, the term of this patent is extended or adjusted under 35 U.S.C. 154(b) by 165 days.

This patent is subject to a terminal disclaimer.

(21) Appl. No.: 17/500,912

(22) Filed: Oct. 13, 2021

(65) Prior Publication Data

US 2022/0067537 A1 Mar. 3, 2022

Related U.S. Application Data

(63) Continuation of application No. 15/906,217, filed on Feb. 27, 2018, now Pat. No. 11,170,305, which is a continuation-in-part of application No. 15/699,669, filed on Sep. 8, 2017, now Pat. No. 11,049,034, which is a continuation-in-part of application No.
(Continued)

(51) Int. Cl.
*G06N 10/00* (2022.01)
*G06N 5/01* (2023.01)
*G06N 3/126* (2023.01)
*G06F 7/58* (2006.01)
*G06N 7/01* (2023.01)
*H04L 9/30* (2006.01)

(52) U.S. Cl.
CPC ............. *G06N 5/013* (2023.01); *G06F 7/582* (2013.01); *G06N 3/126* (2013.01); *G06N 7/01* (2023.01); *G06N 10/00* (2019.01); *H04L 9/3006* (2013.01)

(58) Field of Classification Search
CPC ............................... G06N 10/00; G06F 17/17
See application file for complete search history.

(56) References Cited

U.S. PATENT DOCUMENTS

| 7,113,967 B2 | 9/2006 | Cleve et al. |
| 2005/0133780 A1 | 6/2005 | Azuma |

(Continued)

OTHER PUBLICATIONS

Applebaum, B. et al., "Low-Complexity Cryptographic Hash Functions", 8th Innovations in Theoretical Computer Science (ITCS), 2017, 31 pages.
(Continued)

*Primary Examiner* — Li Wu Chang
(74) *Attorney, Agent, or Firm* — Fenwick & West LLP

(57) ABSTRACT

A method is provided for solving a computational problem that is reducible to a problem of counting solutions to an associated decision problem. The method includes, using a quantum computer, estimating a number of the solutions to the decision problem by determining if there is at least one solution to the decision problem that lies in a pseudo-random set. The method also includes outputting or using the estimated number of the solutions to the decision problem as a solution to the computational problem. Determining if there is at least one solution to the decision problem that lies in the pseudo-random set could include determining if there is a sequence of solutions to the decision problem that, taken together, lies in the pseudo-random set.

20 Claims, 5 Drawing Sheets

Related U.S. Application Data

14/592,876, filed on Jan. 8, 2015, now Pat. No. 10,783,446.

(60) Provisional application No. 61/925,051, filed on Jan. 8, 2014.

(56) References Cited

U.S. PATENT DOCUMENTS

| | | | |
|---|---|---|---|
| 2008/0140749 | A1 | 6/2008 | Amato et al. |
| 2009/0164435 | A1 | 6/2009 | Routt |
| 2015/0081565 | A1 | 3/2015 | Roullier et al. |
| 2017/0286858 | A1 | 10/2017 | La Cour et al. |
| 2017/0364796 | A1 | 12/2017 | Wiebe et al. |
| 2018/0189653 | A1 | 7/2018 | Burchard |
| 2019/0129916 | A1 | 5/2019 | Hidaka |

OTHER PUBLICATIONS

Boyer, M. et al., "Tight bounds on quantum searching", PhysComp96, May 1996, 8 pages.
Burchard, P. H. "A Quantum Solver for Financial Calculations", U.S. Appl. No. 14/592,876, filed Jan. 8, 2015, 34 pages.
Diao, Z. et al., "Quantum Counting: Algorithm and Error Distribution", Acta Applicandae Mathematicae, vol. 118, No. 1, Feb. 2012, pp. 147-159.
Ermon, S. et al., "Optimization with Parity Constraints: From Binary Codes to Discrete Integration", UAI'13 Proceedings of the Twenty-Ninth Conference on Uncertainty in Artificial Intelligence, Aug. 2013, 10 pages.
Fischlin, M. et al., "Security-Amplifying Combiners for Collision-Resistant Hash Functions", Annual International Cryptology Conference, 2007, 18 pages.
Hoyer, P. et al., "Lower Bounds on Quantum Query Complexity", Sep. 2005, 23 pages.
International Search Report dated May 22, 2019 in connection with International Patent Application No. PCT/US2019/017974, 4 pages.
Kutzkov, K. "New upper bound for the #3-SAT Problem", Information Processing Letters 105, 2007, 5 pages.
Liu, W-Z. et al., "A Parallel Quantum Algorithm for the Satisfiability Problem", Communications in Theoretical Physics, vol. 49, No. 3, Mar. 2008, pp. 629-630.
Long, G. et al., "Search an unsorted database with quantum mechanics", Frontiers of Computer Science in China, vol. 1, No. 3, Jul. 2007, pp. 247-271.
Long, G. L. "Grover Algorithm with zero theoretical failure rate", Cornell University Library, Jun. 2001, 5 pages.
Montanaro, A. "Quantum speedup of Monte Carlo methods", The Royal Society Publishing, May 2015, 20 pages.
Shaltiel, R. et al., "Pseudorandomness for Approximate Counting and Sampling", Electronic Colloquium on Computational Complexity, Report No. 86, Oct. 2004, 24 pages.
United States Office Action, U.S. Appl. No. 15/699,669, dated Aug. 3, 2020, 30 pages.
United States Office Action, U.S. Appl. No. 15/699,669, dated Nov. 18, 2020, 15 pages.
United States Office Action, U.S. Appl. No. 16/275,618, dated Aug. 3, 2020, 23 pages.
Valiant, L. G. et al., "NP is as Easy as Detecting Unique Solutions", Theoretical Computer Science 47, 1986, pp. 85-93.
Written Opinion of the International Searching Authority dated May 22, 2019 in connection with International Patent Application No. PCT/US2019/017974, 10 pages.
United States Office Action, U.S. Appl. No. 15/906,217, dated May 7, 2021, eight pages.

SYSTEM AND METHOD FOR PERFORMING FAST COMPUTATIONS USING QUANTUM COUNTING AND PSEUDO-RANDOM SETS

CROSS-REFERENCE TO RELATED APPLICATIONS AND PRIORITY CLAIM

This application is a continuation of U.S. patent application Ser. No. 15/906,217, filed Feb. 27, 2018, which is a continuation-in-part of U.S. patent application Ser. No. 15/699,669 filed on Sep. 8, 2017 (now U.S. Pat. No. 11,049,034), which is a continuation-in-part of U.S. patent application Ser. No. 14/592,876 filed on Jan. 8, 2015 (now U.S. Pat. No. 10,783,446), which claims priority to U.S. Provisional Patent Application No. 61/925,051 filed on Jan. 8, 2014. All of these applications are hereby incorporated by reference in their entirety.

TECHNICAL FIELD

This disclosure generally relates to quantum computing systems. More specifically, this disclosure relates to a system and method for performing fast computations using quantum counting and pseudo-random sets.

BACKGROUND

Many important or useful computations can be expressed as counting problems. For example, Monte Carlo simulations are used in a large number of applications. In its simplest form, a Monte Carlo simulation attempts to count the size of a set by randomly sampling from a given space and seeing which samples fall within or "hit" the set. More generally, a Monte Carlo simulation attempts to compute the integral of a function over a given space, which can be reformulated as counting the size of a set underneath a graph of the function.

Monte Carlo simulation is a very general and robust technique. However, the error of the solution computed using a Monte Carlo simulation decays at a rate of $1/\sqrt{N}$, where N denotes the amount of work performed in the simulation. "Quasi" Monte Carlo techniques have been developed in which the error of the solution eventually decays at a rate of around $1/N$. Unfortunately, quasi Monte Carlo techniques suffer from a penalty equivalent to $(\log N)^D$, where D denotes the number of dimensions of the given space. Thus, quasi Monte Carlo techniques are practical only for very low dimensional spaces.

SUMMARY

This disclosure provides a system and method for performing fast computations using quantum counting and pseudo-random sets.

In a first embodiment, a method is provided for solving a computational problem that is reducible to a problem of counting solutions to an associated decision problem. The method includes, using a quantum computer, estimating a number of the solutions to the decision problem by determining if there is at least one solution to the decision problem that lies in a pseudo-random set. The method also includes outputting or using the estimated number of the solutions to the decision problem as a solution to the computational problem.

In a second embodiment, an apparatus includes a quantum computer having at least one quantum circuit. To solve a computational problem that is reducible to a problem of counting solutions to an associated decision problem, the quantum computer is configured to use the at least one quantum circuit to estimate a number of the solutions to the decision problem by determining if there is at least one solution to the decision problem that lies in a pseudo-random set. The estimated number of the solutions to the decision problem represents a solution to the computational problem.

In a third embodiment, a system includes a quantum computer having at least one quantum circuit and a classical computer having at least one processor configured to execute instructions stored in at least one memory. To solve a computational problem that is reducible to a problem of counting solutions to an associated decision problem, the quantum computer is configured to use the at least one quantum circuit to estimate a number of the solutions to the decision problem by determining if there is at least one solution to the decision problem that lies in a pseudo-random set. The quantum computer is also configured to output, to the classical computer, the estimated number of the solutions to the decision problem as a solution to the computational problem.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
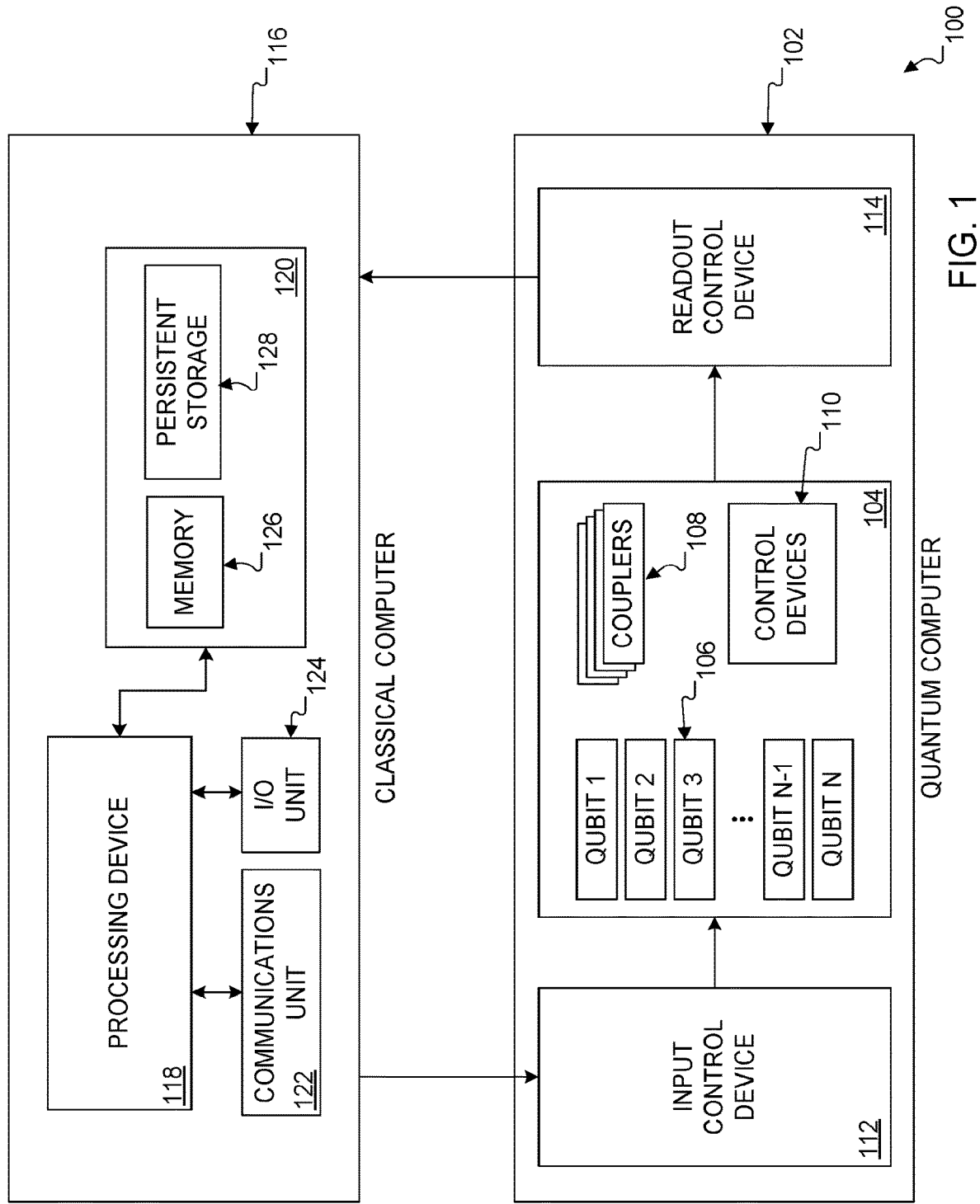
FIG. 1 illustrates an example system for performing fast computations using quantum counting and pseudo-random sets according to this disclosure.

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, many important or useful computations (such as Monte Carlo simulations) can be thought of or implemented as counting problems. This disclosure provides techniques for fast computations on quantum computing hardware using quantum counting and pseudo-random sets. A quantum computer is a computational device that uses quantum mechanics, and quantum computing exploits quantum mechanical phenomena (such as superposition and entanglement) to perform operations on data. A quantum computer is fundamentally different from a classical computer. A classical computer is a two-state system that is characterized by the use of multiple bits, each of which can only have one of two values (a "0" or a "1"). In contrast, a quantum computer can exist in a superposition of states. The building block of a quantum computer is a quantum bit or "qubit," and each qubit can represent a "1," a "0," or any superposition of the two states. In general, an n-qubit quantum computer can exist in any superposition of $2^n$ states simultaneously, while an n-bit classical computer can exist in only one of the $2^n$ states at a given time.

In accordance with this disclosure, quantum computing hardware is used to perform quantum counting to solve various classes of calculations, such as averages, integrations, volumes, and percentiles. This is accomplished by reducing a calculation to a counting problem and solving the counting problem efficiently using the quantum computing hardware. As described below, a number of solutions to a decision problem associated with a computational problem can be estimated and used as a solution to the computational problem. The number of solutions to the decision problem can be estimated by checking if there is an element of a set being counted that lies in an associated pseudo-random set. If desired, efficiency can be achieved by N-fold amplification, such as by finding N elements of a set being counted that, when combined, lie in an associated pseudo-random set (where N>1 and possibly where N>>1).

Note that various models of quantum computing exist, where different quantum computing models correspond to different ways of exploiting superposition and entanglement of quantum mechanics. For example, "gate model" quantum computers apply a sequence of unitary "gate" operators to a prepared quantum system before making a quantum measurement. "Annealing model" quantum computers gradually freeze a quantum system into a low energy state, allowing quantum tunneling to occur during the process. "Topological" quantum computers use qubits in topologically-constrained states that are less sensitive to noise. In the following description, any suitable quantum computing model (now known or later developed) could be used to support fast computations using quantum counting and pseudo-random sets as described in this disclosure.

FIG. 1 illustrates an example system 100 for performing fast computations using quantum counting and pseudo-random sets according to this disclosure. As shown in FIG. 1, the system 100 implements or includes a quantum computing system 102, which includes at least one quantum circuit 104. In this example, each quantum circuit 104 includes or operates using multiple qubits 106 and multiple couplers 108 that provide connectivity between the qubits 106. Each quantum circuit 104 also includes one or more control devices 110 that can affect the qubits 106.

Each qubit 106 denotes any suitable structure configured to implement a quantum bit. Any suitable physical implementations of the qubits 106 (now known or later developed) could be used, such as those that use photons, atoms, ions, atomic nuclei, electrons, optical lattices, Josephson junctions, or quantum dots. Each coupler 108 denotes any suitable structure configured to facilitate interactions between qubits. Any suitable physical implementations of the couplers 108 (now known or later developed) could be used, including those that allow interactions between two qubits 106 and those that allow interactions between more than two qubits 106. Each control device 110 denotes any suitable structure configured to change a state or other characteristic of one or more qubits. Any suitable physical implementations of the control devices 110 (now known or later developed) could be used, such as those that can alter the states of photons, atoms, ions, atomic nuclei, electrons, optical lattices, Josephson junctions, or quantum dots. In some embodiments, the control devices 110 can generate magnetic fields to alter the qubits 106.

In some embodiments, the quantum computing system 102 can include at least one input control device 112 and at least one readout control device 114 that facilitate input/output communications between the quantum computing system 102 and a classical computing system 116. For example, the input control device 112 could receive input data defining a type of problem to be solved or data associated with the problem to be solved, and the readout control device 114 could facilitate read-out of the qubits 106 after the qubits 106 have settled to their lowest energy states. Each control device 112, 114 includes any suitable structure facilitating interactions with an external computing device or system.

In this example, the classical computing system 116 includes at least one processing device 118, at least one storage device 120, at least one communications unit 122, and at least one input/output (I/O) unit 124. The processing device 118 executes instructions that may be loaded into a memory 126. The processing device 118 includes any suitable number(s) and type(s) of processors or other devices in any suitable arrangement. Example types of processing devices 118 include microprocessors, microcontrollers, digital signal processors, field programmable gate arrays, application specific integrated circuits, and discrete circuitry.

The memory device 126 and a persistent storage 128 are examples of storage devices 120, which represent any structure(s) capable of storing and facilitating retrieval of information (such as data, program code, and/or other suitable information on a temporary or permanent basis). The memory device 126 may represent a random access memory or any other suitable volatile or non-volatile storage device(s). The persistent storage 128 may contain one or more components or devices supporting longer-term storage of data, such as a read only memory, hard drive, Flash memory, or optical disc.

The communications unit 122 represents an interface that supports communications with other systems or devices. For example, the communications unit 122 could include a network interface card or a wireless transceiver facilitating communications over a wired or wireless network. The communications unit 122 may support communications through any suitable physical or wireless communication link(s).

The I/O unit 124 allows for input and output of data. For example, the I/O unit 124 may provide a connection for user input through a keyboard, mouse, keypad, touchscreen, or other suitable input device. The I/O unit 124 may also send output to a display, printer, or other suitable output device.

In some embodiments, pre-processing and/or post-processing can be handled by components of the classical computing system 116, while the quantum computing system 102 handles fast computations using quantum counting and pseudo-random sets as described this patent document. In other embodiments, the quantum computing system 102 operates as a standalone device (without a classical computing system 116) and performs fast computations using quantum counting and pseudo-random sets as described this patent document. When implemented as a standalone device, the quantum computing system 102 may or may not be networked with or otherwise connected to other machines. In a networked deployment, the quantum computing system 102 may operate in the capacity of a server or a client machine in a client-server network environment or as a peer machine in a peer-to-peer or distributed network environment.

Although FIG. 1 illustrates one example of a system 100 for performing fast computations using quantum counting and pseudo-random sets, various changes may be made to FIG. 1. For example, while shown as being separate systems, various components of the quantum computing system 102 and the classical computing system 116 could be combined into a single apparatus or system. As a particular example, one, some, or all of the components of the classical computing system 116 could be used in the quantum computing system 102. This may allow, for instance, the quantum computing system 102 to transmit/receive data over at least one network via the communications unit(s) 122 or to transmit/receive I/O data via the I/O unit(s) 124.

Figure 2:
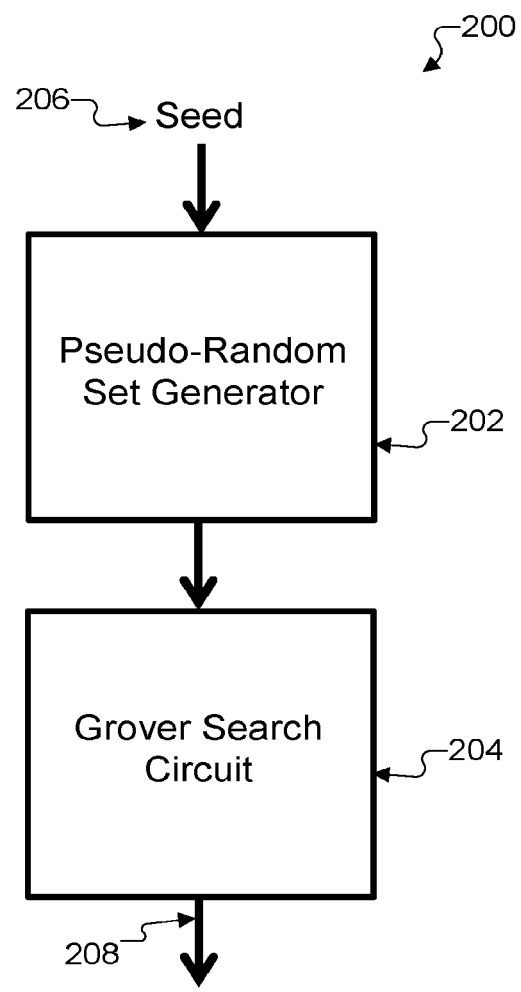
FIGS. 2 and 3 illustrate example techniques for finding a solution or a sequence of solutions to a decision problem that lies in an associated pseudo-random set according to this disclosure.
Figure 3:
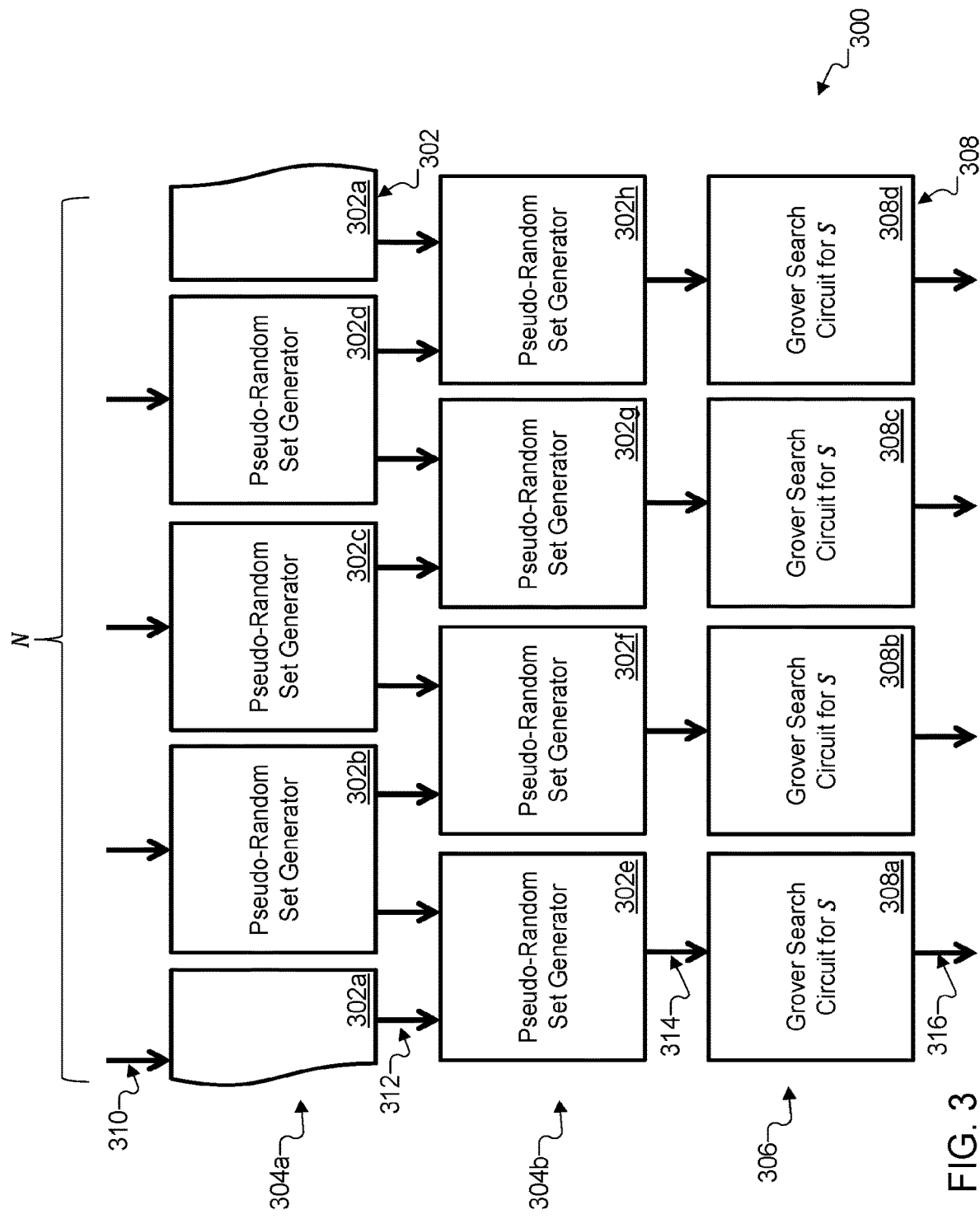

FIGS. 2 and 3 illustrate example techniques for finding a solution or a sequence of solutions to a decision problem that lies in an associated pseudo-random set according to this disclosure. In particular, FIG. 2 illustrates an example circuit 200 used to find a solution to a decision problem that lies in an associated pseudo-random set, and FIG. 3 illustrates an example circuit 300 used to find a sequence of solutions to a decision problem that lies in an associated composite pseudo-random set.

As noted above, various computations can be implemented as counting problems, and these computations can be performed quickly using quantum counting on quantum computing hardware (which may be referred to as a "quantum counter"). A quantum counter could be used in a variety of applications. For example, a quantum counter could be used to solve the following three general classes of calculations (namely because all of these classes of calculations can be translated into corresponding counting problems):

(1) Tail calculations: Over a large set of inputs x, find the $p^{th}$ percentile value of $f(x)$.
(2) Integration calculations: Over a large set of inputs x, find the sum or average of $f(x)$.
(3) American integration calculations: Over a large set of inputs $x=(x_1, \ldots, x_d)$, find the iterated average p( ), where inductively p $(x_1, \ldots, x_d) = f(x_1, \ldots, x_d;$ average$_{x_{d+1}} p(x_1, \ldots, x_{d+1}))$ for some $f$.

For problem class (1) above, the calculation can be reduced to a problem of counting x such that $f(x)<c$ and then performing a binary search for the correct value of c.

For problem class (2) above, the calculation of the average of $f(x)$ can be turned into a problem of counting points under a graph of $f$. In more detail, it can be assumed, without a loss of generality, that $f(x)$ takes values in non-negative integers y with d bits (enough for the desired accuracy). Up to further scaling, the average to be computed is the sum of this $f(x)$ over all x having D bits. This sum amounts to counting the solutions to the following problem: consider strings (x, y) of D+d bits and declare such an (x, y) to be in the set to be counted if $y<f(x)$.

For problem class (3) above, the conditional average $a(x_1, \ldots, x_d)$=average$_{x_{d+1}} p(x_1, \ldots, x_{d+1})$ is represented as the least squares best fit of some chosen functional forms, $a(x_1, \ldots, x_d)=\Sigma_i c_i p_i(x_1, \ldots, x_{d+1})$, resulting in the inductive conclusion that $p(x_1, \ldots, x_d)=f(x_1, \ldots, x_d; \Sigma_i c_i p_i (x_1, \ldots, x_d))$ once the $c_i$ values have been determined. To determine the ci values, the solution of the least squares best fit involves the calculation of the averages of the functions $p(x_1, \ldots, x_{d+1})p_i(x_1, \ldots, x_d)$ and $p_i(x_1, \ldots x_d)p_j(x_1, \ldots, x_d)$ over all truncated inputs $(x_j, \ldots, x_{d+1})$. These function averages can be computed in the same manner as in problem class (2) above.

Quantum computers are more naturally suited for decision problems (finding a solution) rather than counting problems (finding out how many solutions there are). In this document, an NP (non-deterministic polynomial time) class of problems denotes problems whose solutions can be verified quickly by a deterministic machine in polynomial time. Also, a #P class of problems denotes problems that count the number of solutions to a decision problem in the NP class. The #P class is clearly at least as difficult to solve as the NP class and is conjecturally harder to solve. Classical computing systems generally require exponential time to solve NP problems and an even greater exponential time to solve #P problems.

To enable a quantum computer to count solutions in order to solve a #P counting problem (which is related to an NP decision problem), this disclosure provides techniques based on finding one or more solutions to a decision problem that lie in an associated pseudo-random set. This is used to estimate the number of solutions to the decision problem, and the estimated number of solutions to the decision problem can then be used as a solution to the associated computational problem. The precision of the solution count can be amplified or improved by identifying a sequence of solutions to a decision problem that lies in an associated composite pseudo-random set.

In order to provide an estimate of the size of a solution set, the quantum counter uses a pseudo-random set that is generated using a random seed. A determination is then made whether there exists a solution to a decision problem that lies in the pseudo-random set. A small sample of "yes" or "no" answers to the question of whether solutions exist that lie in pseudo-random sets generated by different seeds can be used to obtain an estimate of the solution set size. For example, assume that a solution set S to a decision problem is within an ambient set X and that a pseudo-random set R depends on a choice of seed. Also assume that choosing two random seed values yields one hit on S and one non-hit on S. Given that, the posterior probability distribution for the size |S| of the solution set is proportional to $(1-\exp(-|S|/(|X|/|R|))) \times \exp(-|S|/(|X|/|R|))$. This distribution provides confidence intervals for |S| at any specified probability level. Note that this assumes that the different pseudo-random sets R with different seeds have approximately the same size.

Thus, in some embodiments, an assumption can be made that the size of the solution set S and the size of the ambient set X relative to the pseudo-random sets are comparable. This allows one to obtain the most resolution from a hit or non-hit onto a pseudo-random set generated by a chosen seed. A binary search can be used to efficiently reach the parameters that make this assumption true and yield the most resolution.

Additionally, the quantum counter could optionally accomplish amplification by determining an intersection with a pseudo-random set for a sequence of N solutions to the decision problem (instead of using a single solution). This provides an estimate whose confidence interval shrinks as 1/N. This is because a given confidence interval for the size is $|S^N|=|S|^N$ of the product set provides a confidence interval of 1/N for the size for |S|. One possible goal of the disclosed techniques is to achieve this 1/N convergence with quantum computing resources (such as measured in qubits and/or time) proportional only to N or nearly N, instead of the Monte Carlo requirement of $N^2$ for classical computing. Thus, another requirement could be that the pseudo-random set generation can be implemented in a quantum circuit of size linear or nearly linear in N.

Suppose a pseudo-random set generator is constructed so that the size of the pseudo-random set is approximately independent of the choice of seed and can be controlled to achieve any size (up to some discretization). From this, it is possible to construct a composite pseudo-random set generator having a linear or nearly linear size circuit using the original pseudo-random set generator as a component.

As noted above, the circuit 200 in FIG. 2 is used to find a solution to a decision problem that lies in an associated pseudo-random set. As shown in FIG. 2, the circuit 200 includes two quantum circuits, namely a pseudo-random set generator 202 and a search circuit 204. The pseudo-random set generator 202 is configured to generate a pseudo-random set based on a random seed 206. The search circuit 204 is configured to determine whether a solution to a decision problem falls within the generated pseudo-random set using a quantum search algorithm and to generate an output 208 based on that determination. In some embodiments, each of these quantum circuits could be implemented using the same design as the quantum circuit 104 shown in FIG. 1. However, other embodiments of these quantum circuits could be used. In general, any suitable circuits implementing a quantum computing model could be used here.

In some embodiments, the pseudo-random set generator 202 generates a pseudo-random set using the seed 206 and outputs a superposition of states corresponding to elements of the pseudo-random set. This superposition is taken as the initial state for the search circuit 204, which identifies whether an element of the solution set S lies in the pseudo-random set.

In this particular example, the search circuit 204 is shown as implementing Grover's algorithm (a specific type of quantum search algorithm) to identify whether an element of a solution set lies in a pseudo-random set. However, any other suitable mechanism can be used to perform this function. Note that the search using Grover's algorithm could be based on two reflection operators, including one that reflects the states in the solution set S and another that reflects across the initial state. To achieve reflection across the initial state, a reflection can be conjugated in the chosen seed with the pseudo-random set generator and its inverse. Thus, the search using Grover's algorithm could include in its circuit twice as many copies of the pseudo-random set generator output as the number of Grover iterations required.

The circuit 200 in FIG. 2 can be used to implement a quantum counter by identifying whether one or more solutions exist that lie in one or more pseudo-random sets generated using one or more seeds 206. If so, the solutions can be used to obtain an estimate of the solution set size for a counting problem, and that estimate for the counting problem can then be used as the solution to an associated computational problem.

As noted above, the circuit 300 in FIG. 3 is used to find a sequence of solutions to a decision problem that lies in an associated composite pseudo-random set. As shown in FIG. 3, the circuit 300 includes multiple quantum circuits 302, which include multiple pseudo-random set generators 302a-302h. Each of the pseudo-random set generators 302a-302h could operate in the same or similar as the pseudo-random set generator 202 in order to generate a pseudo-random set based on a random seed. In some embodiments, each of the quantum circuits 302 could be implemented using the same design as the quantum circuit 104 shown in FIG. 1. However, other embodiments of the quantum circuits 302 could be used. In general, any suitable circuits implementing a quantum computing model could be used here.

The quantum circuits 302 are arranged in multiple levels in FIG. 3, namely an upper level 304a and a lower level 304b. In the illustrated example, the upper level 304a includes pseudo-random set generators 302a-302d, and the lower level 304b includes pseudo-random set generators 302e-302h. However, each level 304a and 304b could include any number of quantum circuits. In some embodiments, each level 304a and 304b includes N quantum circuits. Note that the pseudo-random set generator 302a is shown here in divided form for reasons discussed below. The outputs of the pseudo-random set generators in the upper level 304a undergo a permutation (in this example a shift) before being provided to the pseudo-random set generators in the lower level 304b.

The outputs from the pseudo-random set generators 302e-302h in the lower level 304b are provided to a set 306 of parallel search circuits 308a-308d. Each of the search circuits 308a-308d could operate in the same or similar manner as the search circuit 204 in order to determine whether a solution to a decision problem falls within a pseudo-random set. In some embodiments, each of the search circuits 308a-308d could be implemented using the same design as the quantum circuit 104 shown in FIG. 1. However, other embodiments of the search circuits 308a-308d could be used. In general, any suitable circuits implementing a quantum computing model could be used here. Also, the set 306 could include any number of search circuits, and in some embodiments the level 306 includes N search circuits. In addition, while shown as using Grover's algorithm, the search circuits 308a-308d could use any other suitable mechanism to identify whether a solution to a decision problem falls within a pseudo-random set.

The circuit 300 in FIG. 3 can be used to implement a quantum counter as follows. Let X denote an input set of an associated NP decision problem, and let r denote an estimate of the size of the solution set S so that $r^N$ is an estimate of the size of the product set $S^N$ of sequences of N solutions to the decision problem. Start with N inputs 310, each of which could include (i) a seed associated with approximately $\log_2 r$ qubits and (ii) $\log_2 N$ zero qubits.

Each of the pseudo-random set generators 302a-302d generates a superposition of N intermediate pseudo-random values based on its input 310. The outputs of the pseudo-random set generators 302a-302d collectively form a concatenated pseudo-random set. The superposition generated by each pseudo-random set generator 302a-302d represents the superposition of N intermediate pseudo-random values out of approximately N×r total possible values, and each superposition can include or be associated with approximately ($\log_2 r + \log_2 N$) qubits. The pseudo-random set generators 302a-302d therefore collectively generate a concatenated pseudo-random set with N components (each component itself representing a pseudo-random set).

The resulting qubits are then shuffled, such as by shifting them circularly by one-half of the width of the intermediate value for each element. This results in a new sequence of N permuted intermediate values 312. Each of the pseudo-random set generators 302e-302h could therefore receive qubits defining a superposition of $N^2$ seeds, plus $\log_2 |X|/|S|$ zero qubits.

The pseudo-random set generators 302e-302h perform the same or similar function using the permuted intermediate values 312 to produce output pseudo-random sets 314, which collectively form another concatenated pseudo-random set. In some embodiments, each output pseudo-random set 314 could have approximately $|X|/|S|$ total possible pseudo-random values. The pseudo-random set generators 302e-302h again collectively generate a concatenated pseudo-random set with N components (each component itself representing a pseudo-random set). This concatenated pseudo-random set with N components is referred to as a composite pseudo-random set. Each of the pseudo-random set generators 302e-302h could therefore output qubits defining a superposition of $N^2$ sets of $|X|/|S|$ pseudo-random values.

The pseudo-random set generator 302a here is shown in divided form to represent the fact that the pseudo-random set generator 302a provides half of its output qubits to the pseudo-random set generator 302e and half of its output qubits to the pseudo-random set generator 302h. This is due to the shifting used to generate the permuted intermediate values 312. Note, however, that other techniques besides shifting could be used to shuffle the intermediate values 312.

The search circuits 308a-308d collectively determine whether N solutions to a decision problem fall within the generated composite pseudo-random set. Outputs 316 from the search circuits 308a-308d are generated based on those determinations and indicate whether the N solutions fall within the composite pseudo-random set. This can be used to obtain an estimate of the solution set size for a counting problem, and the estimate can be used as the solution to an associated computational problem. In some embodiments, each of the search circuits 308a-308d can make its determination in approximately $\sim\sqrt{|X|/|S|}$ steps.

Note that if the quantum circuit size of each individual pseudo-random set generator 302a-302h is polynomial in the number of input and output bits of degree p, the composite pseudo-random set generator created using the collection of individual pseudo-random set generators 302a-302h could use a quantum circuit of a size proportional to $N(\log_2 N)P$ by construction. This means that the composite pseudo-random set generator in FIG. 3 is nearly linear in size with N.

Although FIGS. 2 and 3 illustrate examples of techniques for finding a solution or a sequence of solutions to a decision problem that lies in an associated pseudo-random set, various changes may be made to FIGS. 2 and 3. For example, each of the circuits 200 and 300 could include any suitable numbers and arrangements of pseudo-random set generators and search circuits. Also, other mechanisms besides searches using Grover's algorithm could be used to identify elements of a solution set that lie in a pseudo-random set.

Figure 4:
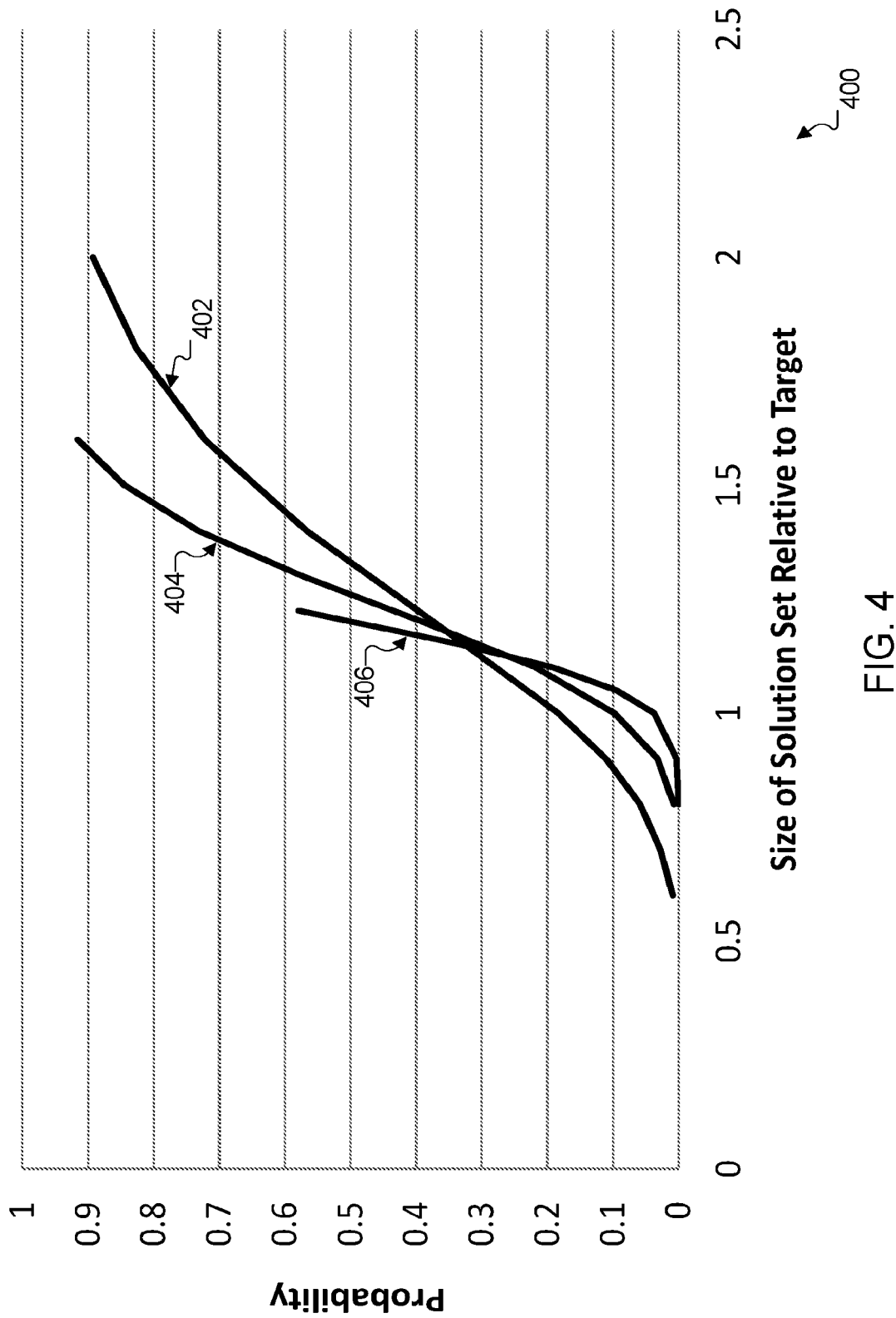
FIG. 4 illustrates example results obtained using a technique for finding a solution or a sequence of solutions to a decision problem that lies in an associated pseudo-random set according to this disclosure.

FIG. 4 illustrates example results obtained using a technique for finding a solution or a sequence of solutions to a decision problem that lies in an associated pseudo-random set according to this disclosure. In particular, FIG. 4 contains an example chart 400 illustrating simulation results showing that a composite pseudo-random set (such as one generated in the circuit 300 of FIG. 3) is sufficiently random to meet various requirements discussed above.

As shown in FIG. 4, the chart 400 plots the probability of hitting a pseudo-random set as a function of the size of the solution set S. A line 402 represents results obtained using an amplification where N equals 8, a line 404 represents results obtained using an amplification where N equals 16, and a line 406 represents results obtained using an amplification where N equals 32. As can be seen here, with amplification N, the estimation error of the size of S decreases as 1/N. In contrast, using a concatenation of N pseudo-random sets (such as only the outputs of the upper level 304a in FIG. 3 without the permutation and use of the lower level 304b) would cause the estimation error to decrease as $1/\sqrt{N}$, which is equivalent to Monte Carlo simulations using classical computing systems.

Although FIG. 4 illustrates examples of results obtained using a technique for finding a solution or a sequence of solutions to a decision problem that lies in an associated pseudo-random set, various changes may be made to FIG. 4. For instance, the results shown in FIG. 4 are merely example results, and other results could be obtained depending on the implementation.

Figure 5:
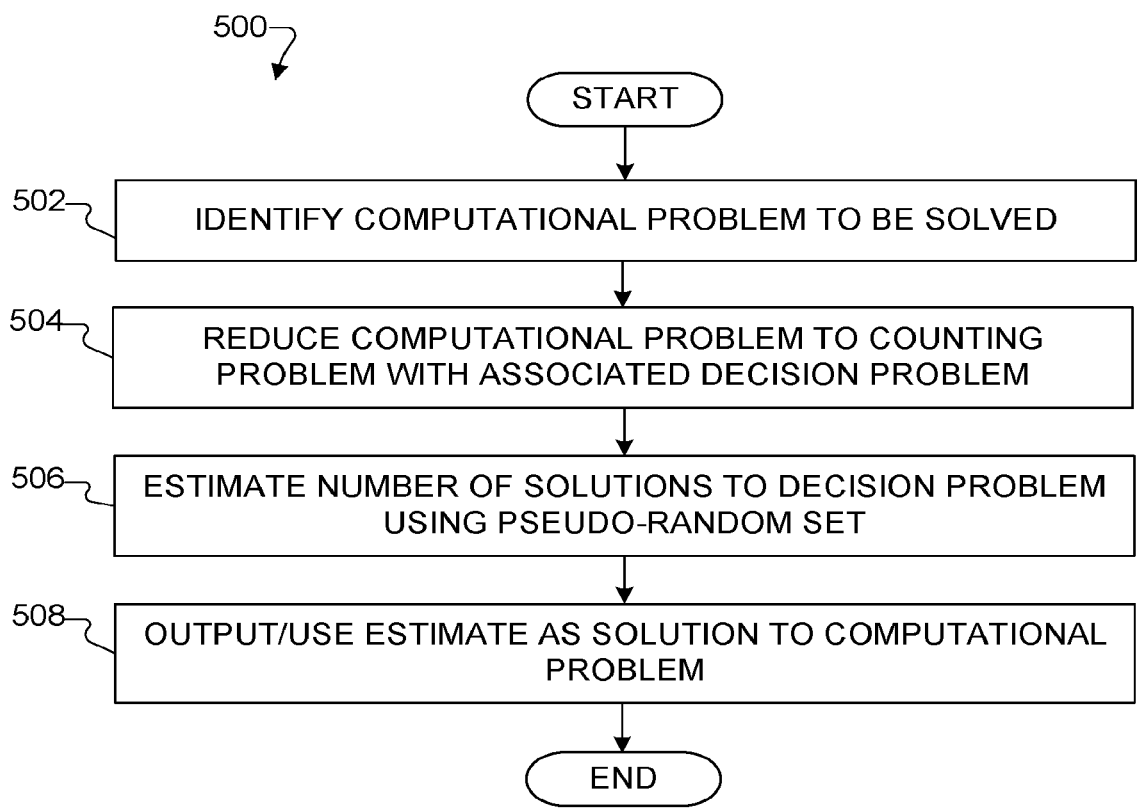
FIG. 5 illustrates an example method for performing fast computations using quantum counting and pseudo-random sets according to this disclosure.

FIG. 5 illustrates an example method 500 for performing fast computations using quantum counting and pseudo-random sets according to this disclosure. For ease of explanation, the method 500 of FIG. 5 is described as being used with the system 100 of FIG. 1 and the circuits 200 and 300 of FIGS. 2 and 3. However, the method 500 could be used with any other suitable device or system.

As shown in FIG. 5, a computational problem to be solved is identified at step 502, and the computational problem is reduced to a counting problem having an associated decision problem at step 504. This could include, for example, identifying a computational problem in the NP class involving an average, integration, volume, or percentile and generating a corresponding counting problem in the #P class. As a particular example, this could involve identifying one of the three classes of problems discussed above (tail, integration, or American integration calculations) and identifying a corresponding counting problem. Note that these steps could be performed manually or in a partially or fully automated manner, such as by using a classical computing system 116.

In some embodiments, the computational problem involves finding a percentile of a function $f(x)$ over a large number of inputs x, and the associated decision problem is to decide whether there is an x such that $f(x)<c$ for a given c. In other embodiments, the computational problem involves finding an average, sum, or integral of a function $f(x)$ over a large number of inputs x, and the associated decision problem is to decide whether there is a pair (x, y) for which $y<f(x)$. In still other embodiments, the computational problem involves finding a conditional expectation P( ) over a large number of inputs $(x_l, \ldots, x_d)$, where $p(x_l, \ldots, x_d)=f(x_l, \ldots, x_d; \text{average}_{x_{d+l}} p(x_l, \ldots, x_{d+1}))$ for some function $f( )$ cover truncated inputs $(x_l, \ldots, x_d; a)$. Here, the computational problem is partially reduced to the problem of computing averages of $p(x_l, \ldots, x_{d+i})$ $p_i(x_l, \ldots, x_d)$ and $p_i(x_l, \ldots, x_d)p_j(x_l, \ldots, x_d)$ over the truncated inputs $(x_l, \ldots, x_{d+l})$ where $p_i$ and $p_j$ denote regression functions.

An estimate of the number of solutions to the decision problem is identified using an associated pseudo-random set at step 506. In some embodiments, this could include, for example, using a quantum computing system 102 in which the circuit 200 is used to generate a pseudo-random set based on a random seed 206. The quantum computing system 102 then determines if there is a solution to the decision problem that lies in the generated pseudo-random set using the search circuit 204. This could be repeated multiple times, such as with different pseudo-random sets generated using different random seeds 206.

In other embodiments, this could include, for example, using a quantum computing system 102 in which the circuit 300 is used to generate a composite pseudo-random set based on inputs 310 using the pseudo-random set generators 302a-302h. The quantum computing system 102 then determines if there is a sequence of solutions to the decision problem that lies in the composite pseudo-random set using the search circuits 308a-308d. In particular embodiments, the quantum system used with a sequence of N inputs to the decision problem can have a size that is linear or nearly linear in N. Also, in particular embodiments, the quantum circuits 302 are arranged in multiple levels 304a and 304b.

A composite pseudo-random set for a sequence of N inputs to the decision problem can be constructed using a concatenation of pseudo-random sets in the upper level 304a, a permutation (such as a shifting of intermediate values), and a concatenation of pseudo-random sets in the lower level 304b.

The estimated count of the number of solutions to the decision problem is output or used as a solution to the computational problem at step 508. This could include, for example, the quantum computing system 102 or the classical computing system 116 using the (possibly amplified) estimated number of solutions as the solution to the computational problem in the NP class.

Although FIG. 5 illustrates one example of a method 500 for performing fast computations using quantum counting and pseudo-random sets, various changes may be made to FIG. 5. For example, while shown as a series of steps, various steps in FIG. 5 could overlap, occur in parallel, or occur any number of times. Also, the method 500 could be performed using a quantum computing system that includes at least one quantum circuit configured to perform quantum counting. Other operations may or may not be performed by the quantum computing system, such as when certain functions are performed by a classical computing system that interacts with the quantum computing system via an input control device 112 and a readout control device 114.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A method comprising:
accessing a computational problem that is reducible to a problem of counting solutions to a decision problem associated with the computational problem;
estimating, using a quantum computer, a number of the solutions to the decision problem by:
evaluating the computational problem by:
finding a conditional expectation over a range of inputs, where the conditional expectation for the range of inputs is a function based on the range of inputs and a conditional average over a first truncated range of inputs of the range of inputs; and
evaluating a first conditional average and a second conditional average over a second truncated range of inputs of the range of inputs;
identifying that the decision problem associated with the computational problem is solvable by counting solutions to the decision problem based on evaluation of the computational problem;
accessing a set of random numbers;
determining that there are a number of solutions to the decision problem in the accessed set of random numbers; and
counting the number of solutions in the accessed set of random numbers; and
outputting the number of the solutions to the decision problem as a solution to the computational problem.

2. The method of claim 1, wherein determining that there are the number of solutions to the decision problem in the accessed set of random numbers comprises:
determining that there is a sequence of solutions to the decision problem that, taken together, lies in the accessed set of random numbers.

3. The method of claim 1, wherein the number of solutions is linearly proportional to a number of quantum circuits in the quantum computer configured to generate the set of random numbers.

4. The method of claim 1, further comprising:
generating the accessed set of random numbers by:
- generating one or more first component random sets using one or more seeds;
- performing a permutation of qubits in the one or more first component random sets;
- generating one or more second component random sets using a result of the permutation; and
- combining the one or more second component random sets to form the accessed set of random numbers.

5. The method of claim 4, wherein performing the permutation comprises circularly shifting qubits in the one or more first component random sets.

6. The method of claim 1, wherein the number of solutions is inversely proportional to an error determined when estimating the number of the solutions to the decision problem.

7. The method of claim 1, further comprising:
determining a class of the computational problem,
wherein estimating the number of solutions of the decision problem associated with the computational problem is based on the class of the computational problem.

8. The method of claim 1, wherein the solution to the computational problem is output using a classical computer.

9. A non-transitory computer-readable storage medium storing computer program instructions, the computer program instructions, when executed by one or more processors, causing the one or more processors to:
- access a computational problem that is reducible to a problem of counting solutions to a decision problem associated with the computational problem;
- estimate, using a quantum computer, a number of the solutions to the decision problem by:
  - evaluating the computational problem by:
    - finding a conditional expectation over a range of inputs, where the conditional expectation for the range of inputs is a function based on the range of inputs and a conditional average over a first truncated range of inputs from the range of inputs; and
    - evaluating a first conditional average and a second conditional average over a second truncated range of inputs from the range inputs;
  - identifying that the decision problem associated with the computational problem is solvable by counting solutions to the decision problem based on evaluation of the computational problem;
  - accessing a set of random numbers;
  - determining that there are a number of solutions to the decision problem in the accessed set of random numbers; and
  - counting the number of solutions in the accessed set of random numbers; and
- output the number of the solutions to the decision problem as a solution to the computational problem.

10. The non-transitory computer-readable storage medium of claim 9, wherein executing computer program code causing the one or more processors to determine that there are the number of solutions to the decision problem in the accessed random numbers further causes the one or more processors to execute computer program code to:
- determine that there is a sequence of solutions to the decision problem that, taken together, lies in the accessed set of random numbers.

11. The non-transitory computer-readable storage medium of claim 9, wherein the number of solutions is linearly proportional to a number of quantum circuits in the quantum computer configured to generate the set of random numbers.

12. The non-transitory computer-readable storage medium of claim 9, wherein the one or more processors executes computer program code that causes the one or more processors to:
generate the accessed set of random numbers by:
- generating one or more first component random sets using one or more seeds;
- performing a permutation of qubits in the one or more first component random sets;
- generating one or more second component random sets using a result of the permutation; and
- combining the one or more second component random sets to form accessed set of random numbers.

13. The non-transitory computer-readable storage medium of claim 12, wherein performing the permutation comprises circularly shifting qubits in the one or more first component random sets.

14. The non-transitory computer-readable storage medium of claim 9, wherein the number of solutions is inversely proportional to an error determined when estimating the number of the solutions to the decision problem.

15. The non-transitory computer-readable storage medium of claim 12, wherein the one or more processors executes computer program code that causes the one or more processors to:
determine a class of the computational problem, and
wherein estimating the number of solutions of the decision problem associated with the computational problem is based on the class of the computational problem.

16. The non-transitory computer-readable storage medium claim 12, wherein the solution to the computational problem is output using a classical computer.

17. A system comprising:
one or more processors; and
a non-transitory computer-readable storage medium storing computer program instructions, the computer program instructions, when executed by one or more processors, causing the one or more processors to:
- access a computational problem that is reducible to a problem of counting solutions to a decision problem associated with the computational problem;
- estimate, using a quantum computer, a number of the solutions to the decision problem by:
  - evaluating the computational problem by:
    - finding a conditional expectation over a range of inputs, where the conditional expectation for the range of inputs is a function based on the range of inputs and a conditional average over a first truncated range of inputs of the range of inputs; and
    - evaluating a first conditional average and a second conditional average over a second truncated range of inputs of the range of inputs;
  - identifying that the decision problem associated with the computational problem is solvable by counting solutions to the decision problem based on evaluation of the computational problem;
  - accessing a set of random numbers;
  - determining that there are a number of solutions to the decision problem in the accessed set of random numbers; and
  - counting the number of solutions in the accessed set of random numbers; and output the number of the solutions to the decision problem as a solution to the computational problem.

18. The system of claim 17, wherein executing computer program code causing the one or more processors to determine that there are the number of solutions to the decision problem in the accessed random numbers further causes the one or more processors to execute computer program code to:
  determine that there is a sequence of solutions to the decision problem that, taken together, lies in the accessed set of random numbers.

19. The system of claim 17, wherein the number of solutions is linearly proportional to a number of quantum circuits in the quantum computer configured to generate the set of random numbers.

20. The system of claim 17, wherein the one or more processors executes computer program code that causes the one or more processors to:
  generate the accessed set of random numbers by:
    generating one or more first component random sets using one or more seeds;
    performing a permutation of qubits in the one or more first component random sets;
    generating one or more second component random sets using a result of the permutation; and
    combining the one or more second component random sets to form the accessed set of random numbers.

* * * * *